T866029

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1438

732,021

POLYMERIC COATING COMPOSITION AND COATED SUBSTRATES

Jack W. Lowe, Jr., 520 Rambling Road, Kingsport, Tenn. 37663, Larry G. Curtis, 3606 Cimarron Drive, Johnson City, Tenn. 37601, and Roy G. Foulk, 1357 Garden Drive, Kingsport, Tenn. 37664

Filed May 27, 1968. Published Sept. 30, 1969

Int. Cl. C08f *15/18;* C09d *5/32, 3/80*

U.S. Cl. 117—64

No Drawing. 11 Pages Specification

Coating compositions, coated substrates, and coating process are disclosed which provide improved stability with respect to degradative effects of ultraviolet light. The coating composition comprises a film-forming material which includes as the principal film-forming material, a polymer derived from at least two copolymerizable monomers, one of which is methyl methacrylate and the other a monomeric ultraviolet light inhibitor, namely 4-benzoyl-3-hydroxyphenoxyethyl acrylate or 4-benzoyl-3-hydroxyphenoxyethyl methacrylate, and a volatile solvent therefor. Combinations of these monomeric inhibitors may also be used. Monomeric methyl methacrylate may be used in amounts between about 38.0% and 80.0% by weight with about 0.1% to 5.0% by weight of the monomeric ultraviolet light inhibitor and about 19.0% to 60.0% by weight of other monomeric materials. The coating compositions are applied to substrates and initially baked at about 150–225° F. for a time sufficient to volatilize the solvent. The coating is then smoothed to remove surface imperfections, and finally baked at about 275°–325° F. to soften and reflow the coating into a smooth finish.